(12) United States Patent
Ma et al.

(10) Patent No.: US 11,885,925 B2
(45) Date of Patent: Jan. 30, 2024

(54) SYSTEM AND METHODS FOR EVALUATING A FORMATION USING PIXELATED SOLUTIONS OF FORMATION DATA

(71) Applicant: Halliburton Energy Services, Inc., Houston, TX (US)

(72) Inventors: Jin Ma, Houston, TX (US); Clint Lozinsky, Kingwood, TX (US); Hsu-Hsiang Wu, Sugar Land, TX (US); Li Pan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 55 days.

(21) Appl. No.: 17/807,276

(22) Filed: Jun. 16, 2022

(65) Prior Publication Data

US 2022/0404520 A1    Dec. 22, 2022

Related U.S. Application Data (60) Provisional application No. 63/202,697, filed on Jun. 21, 2021.

(51) Int. Cl.
  *G01V 3/30* (2006.01)
  *E21B 49/00* (2006.01)
(52) U.S. Cl.
  CPC ............... *G01V 3/30* (2013.01); *E21B 49/00* (2013.01); *E21B 2200/20* (2020.05)
(58) Field of Classification Search
  None
  See application file for complete search history.

(56) References Cited

U.S. PATENT DOCUMENTS

| | | |
|---|---|---|
| 2015/0088426 A1 | 3/2015 | Tang |
| 2016/0002977 A1 | 1/2016 | Wu et al. |

(Continued)

FOREIGN PATENT DOCUMENTS

| | | |
|---|---|---|
| WO | 2018208282 A1 | 11/2018 |
| WO | 2020231432 A1 | 11/2020 |

OTHER PUBLICATIONS

International Search Report and the Written Opinion dated Sep. 30, 2022 for corresponding PCT Patent Application No. PCT/US2022/073021 filed on Jun. 17, 2022.

*Primary Examiner* — Douglas X Rodriguez
(74) *Attorney, Agent, or Firm* — K&L Gates LLP (57) ABSTRACT

A system and method for evaluating a subterranean formation includes a logging tool that includes transmitter and receiver antennae. The transmitter antenna transmits a first electromagnetic signal into the formation at a plurality of depths. The receiver antenna receives a plurality of second electromagnetic signals emitted by the formation in response to the first signal. The system and method also include a processor configured to calculate resistivity values for the second signals, calculate solutions to an inversion algorithm of the formation, filter the solutions into a plurality of convergent solutions, pixilate the convergent solutions into pixilated solutions, calculate ensemble statistics for the pixilated solutions, calculate a difference in resistivity value between successive pixels, identify presumptive layer boundaries based on the differences in resistivity values, calculate composite resistivity statistics from the pixilated solutions based on the presumptive layer boundaries and the ensemble statistics, and generate a formation model.

20 Claims, 5 Drawing Sheets

(56) References Cited

U.S. PATENT DOCUMENTS

| | | |
|---|---|---|
| 2018/0348395 A1 | 12/2018 | Wilson et al. |
| 2019/0078435 A1 | 3/2019 | Song et al. |
| 2019/0346584 A1* | 11/2019 | Wu .......................... G01V 3/18 |
| 2021/0048553 A1 | 2/2021 | Guner et al. |
| 2021/0132251 A1 | 5/2021 | Dong et al. |

* cited by examiner

SYSTEM AND METHODS FOR EVALUATING A FORMATION USING PIXELATED SOLUTIONS OF FORMATION DATA

BACKGROUND

This section is intended to provide relevant background information to facilitate a better understanding of the various aspects of the described aspects. Accordingly, it should be understood that these statements are to be read in this light and not as admissions of prior art.

Petroleum drilling and production operations demand a great quantity of information relating to the parameters and conditions downhole. Such information may include the location and orientation of the wellbore and drilling assembly, earth formation properties, and parameters of the downhole drilling environment. The collection of information relating to formation properties and downhole conditions is commonly referred to as "logging", and can be performed during the drilling process itself (hence the term "logging while drilling" or "LWD," frequently used interchangeably with the term "measurement while drilling" or "MWD").

Various measurement tools are used in LWD applications. One such tool is a resistivity tool, which includes one or more antennae for receiving a formation response and may include one or more antennae for transmitting an electromagnetic signal into the formation. When operated at low frequencies, the resistivity tool may be called an induction tool, and at high frequencies the resistivity tool may be called an electromagnetic wave propagation tool. Though the physical phenomena that dominate the measurement may vary with frequency, the operating principles for the tool are consistent. In some cases, the amplitude and/or the phase of the received signals may be compared to the amplitude and/or phase of the transmitter signals to measure the formation resistivity. In other cases, the amplitude and/or phase of multiple receiver signals may be compared to each other to measure the formation resistivity.

A layered model-based inversion algorithm has been used in the electromagnetic resistivity logging tools to identify major boundaries between different formation strata resistivities. A one-dimensional (1D) formation assumption is typically used in the inversion algorithm as well, where each layered boundary are mutually parallel. The formation assumptions are fairly true owing to the detection range of the measurements used in the inversion. Generally speaking, the typical detection range of the conventional resistivity logging tools is around 5 feet (1.5 meters) to 10 feet (3 meters) and the maximum detection is around 18 feet (5.5 meters).

Ultra-deep resistivity logging tools may detect formation boundaries up to about 200 feet (60 meters) radially outward from the tool, which provides a much deeper detection range than conventional logging tools. Within the depth of investigation, there are usually multiple strata and a qualitative method such as correlation method may fail due to computational complexity. A boundary mapping algorithm such as a distance-to-bed-boundary (DTBB) inversion algorithm (hereafter inversion algorithm) may be used to interpret the tool responses qualitatively and evaluate the subterranean earth formation to identify formation zones that are suitable for producing formation fluids, such as hydrocarbons.

BRIEF DESCRIPTION OF THE DRAWINGS

Aspects of the invention are described with reference to the following figures. The same numbers are used throughout the figures to reference like features and components. The features depicted in the figures are not necessarily shown to scale. Certain features of the aspects may be shown exaggerated in scale or in somewhat schematic form, and some details of elements may not be shown in the interest of clarity and conciseness.

DETAILED DESCRIPTION

In subsurface drilling for oil or other liquid extractable resources from underground geological strata, it is important to direct the drill into the strata containing the extractable resources. Such resources may be associated with certain types of strata. It is therefore necessary to determine the type of strata into which the drill is directed. The strata may be characterized by any of a number of physical properties including, as one non-limiting example, the resistivity of the strata material. It is useful to characterize the strata during the drilling operation, so that the direction and orientation of the drill may be adjusted in real time. This real time determination of strata characteristics is part of the logging while drilling (LWD) process.

Not only is it important to characterize the strata immediately adjacent to the wellbore, but it is also important to characterize the strata extending at some distance orthogonal to the wellbore direction (azimuthal strata data). In this manner, the drill bit may be directed closer to strata that may contain the extractable resources, a process termed "geo-steering." As disclosed above, one method of determining the azimuthal resistance (including signal amplitude and signal phase) may be to transmit an alternating current (AC) signal into the strata and to receive a signal conducted, transmitted, or reflected from the strata. Such signals, termed azimuthal resistivities, may be considered signals emitted by the strata in response to receiving the transmitted AC signal. The measured resistivity data may be acquired at a single measurement depth for a transmitted AC signal at one frequency or at a number of frequencies. Further, the measured resistivity data may be acquired over several successive measurement depths (a sliding window method) either separately or combined. The measured resistivity data may include all of the measured azimuthal resistance values (including signal amplitude and signal phase) over the multiple transmitter frequencies and successive measurement depths.

It may be recognized that multiple strata may be disposed in the subsurface formation, either radiating laterally from the wellbore, along the line of the wellbore, or a combination thereof. Multiple strata may be separated by discontinuities, or there may be faults within a stratum. Accurate models of the subterranean formation may include not only identifications of each stratum, but the location of the discontinuities separating adjacent strata. DTBB inversion algorithms (hereafter, inversion algorithms) may be used to model the subterranean formation based on the resistivity data measured by the logging tool.

An inversion algorithm may start with an initial set of conditions to describe the subterranean formation, such as, for example, a number of strata layers, and a randomly assigned resistivity value for each layer. This initial set of conditions may be successively modified, for example a strata's resistivity value, until the algorithm produces a solution. In some non-limiting aspects, the algorithm successively modifies the initial set of conditions based on a gradient search technique, such as a Gauss-Newton search method. Typically, an inversion algorithm solution may be a one dimensional solution curve of resistivity versus measurement depth. In some non-limiting aspects, the inversion algorithm may generate a two dimensional solution of resistivity versus measurement depth and angular position about the wellbore. The inversion algorithm solution (hereafter, solution) may be characterized by modeled resistivity data over distance or distance and angular position. The modeled resistivity data may be produced by a specific model of the formation defined over a measurement depth. A solution may be said to converge if the modeled resistivity data are consistent with the measured resistivity data (to within a threshold value). Alternatively, a solution may be said to diverge if the modeled resistivity data are inconsistent with the measured resistivity data (to within the threshold value). In some aspects, the solution resistivity data may be compared to the measured resistivity obtained from measured wellbore data using a least-squares algorithm.

The inversion algorithms may be run using a number of initial sets of conditions, each initial set leading to a new solution of modeled resistivity data which may be convergent or divergent (compared to the measured data). Multiple initial sets of conditions may be run. In some non-limiting examples, hundreds of initial sets of conditions may be used. For example initial sets of conditions may be defined as having one stratum, two strata, three strata, or any countable number of strata. Initially, each stratum may be characterized by a randomly selected resistivity value. Each of the initial sets of data may result in a new solution producing predicted modeled resistivity data derived from a specific model of the formation. However, several different initial sets of data may result in convergent solutions that are all consistent with the measured data, but represent different models of the subterranean formation. Such multiple convergent solutions may result from inversion algorithm ambiguity. As discussed above, the inversion algorithm may be used to determine how to direct the drilling bit through the subterranean formation. A driller, however, may not be able to determine, among the multiple convergent solutions, which is the most likely representation of the formation.

The plurality of convergent solutions may be statistically analyzed, forming distributions of the modeled resistivity data through the measurement distance. These modeled resistivity distributions are typically analyzed to determine one or more statistical summaries of the data. Such statistical summaries may include ensemble statistics derived from the multiple solutions to the inversion algorithm. In some instances, the ensemble statistics may include an average modeling solution, a lower 5th percentile modeling solution (D05), a median modeling solution (D50), or a lower 95th percentile modeling solution (D95). D05 statistics may represent a more conductive solution and thus may be good to identify conductive formations. D50 and average ensemble statistics may be useful to pick up the median resistivity value. D95 ensemble statistics may represent more resistivity solution and may be useful to identify resistive formation.

However, if the formation has multilayers with high contrast, which includes both very high resistive layer (for example layers having a resistivity of 200 Ohms and greater) and very high conductive layer (for example, layers having a resistivity of 50 Ohms and lower), then none of these distributions alone could represent the best resistivity profile, as D05 will make the high resistive layer more conductive, D50 and Davg will make the high resistive layer less resistive, and the high conductive layer less conductive, and D95 will make the high conductive layer more resistive. As a result, it may be difficult to resolve the boundaries between the successive multilayers. Thus, since these statistical summaries may be biased to certain resistivity values, none of them alone can represent a formation model with a good contrast (that is, having well defined separation between adjacent strata). The determination of the best statistical summary to characterize a given stratum in the subterranean formation may require accurate knowledge of the boundaries of the adjoining strata.

It is therefore useful to improve the statistical analyses of the multiple solutions generated by an inversion algorithm by determining the most likely position of strata boundaries or discontinuities.

Although the above disclosure relates to resistivity data as one exemplary type of data that may be used in the inversion algorithms, other data related to physically measurable properties of the strata may be used instead, for example magnetometer data to obtain magnetic field tensor data.

Figure 1:
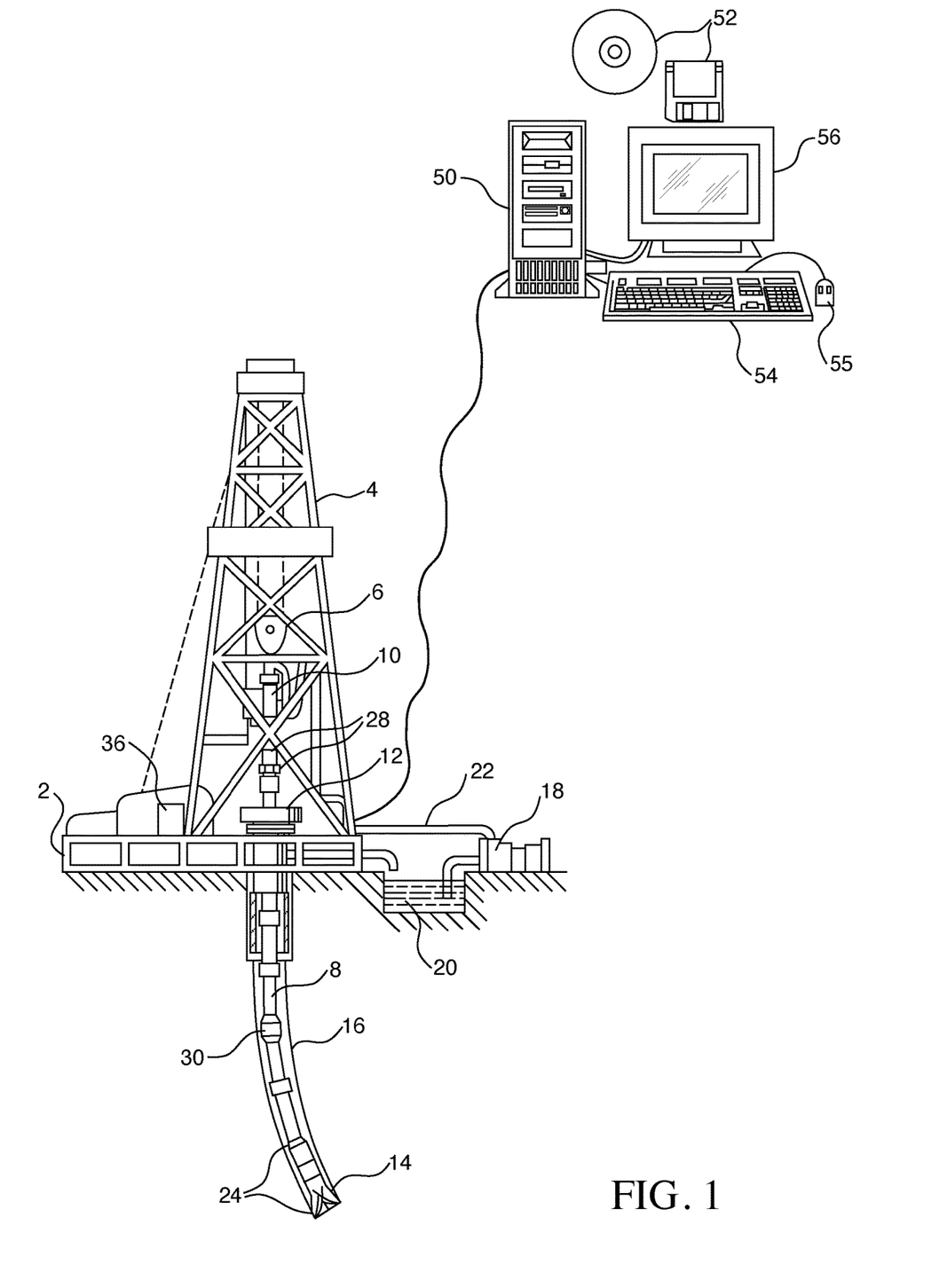
FIG. 1 depicts an elevation view of a logging-while-drilling environment, according to one or more aspects.

FIG. 1 shows one or more aspects of an illustrative LWD environment. A drilling platform 2 supports a derrick 4 having a traveling block 6 for raising and lowering a drillstring 8. A top drive 10 supports and rotates the drillstring 8 as it is lowered through the wellhead 12. A drill bit 14 is driven by a downhole motor and/or rotation of the drillstring 8. As bit 14 rotates, it creates a wellbore 16 that passes through various strata of the subterranean formation. A pump 18 circulates drilling fluid 20 through a feed pipe 22, through the interior of the drillstring 8 to drill bit 14. The fluid exits through orifices in the drill bit 14 and flows upward through the annulus around the drillstring 8 to transport drill cuttings to the surface, where the fluid is filtered and recirculated.

The drill bit 14 is just one piece of a bottom-hole assembly 24 that includes a mud motor and one or more "drill collars" (thick-walled steel pipes) that provide weight and rigidity to aid the drilling process. In some aspects, these drill collars include built-in logging instruments to gather measurements of various drilling parameters such as location, orientation, weight-on-bit, wellbore diameter, etc. The tool orientation may be specified in terms of one or more of a tool face angle (rotational orientation), an inclination angle (the slope), a compass direction, and any combination or combinations thereof, each of which can be derived from measurements by one or more sensor types. Such sensor types may include, without limitation, magnetometers, inclinometers, and/or accelerometers, although other sensor types such as gyroscopes may alternatively be used. In one specific aspect, the tool may include a 3-axis fluxgate magnetometer and a 3-axis accelerometer. As is known in the art, the combination of those two sensor systems may enable the measurement of the tool face angle, inclination angle, and compass direction. Such orientation measurements can be combined with gyroscopic or inertial measurements to accurately track tool position and orientation.

The bottom-hole assembly 24 may include one or more aspects of measurement devices such as, without limitation, resistivity monitors, gamma ray monitors, drillstring 8 angular orientation monitors, pressure monitors, temperature monitors, and other devices to measure the physical conditions within the wellbore. Such devices may be used, without limitation, to measure formation resistivity, formation gamma ray intensity, the inclination and azimuth of the drillstring 8, wellbore pressure, and wellbore temperature, among other physical parameters to characterize the wellbore environment. In an aspect, a bottom-hole assembly 24 may include a telemetry sub to maintain a communications link with the surface. In one aspect, mud pulse telemetry may be one common telemetry technique for transferring tool measurements data to surface receivers and receiving commands from the surface, but other telemetry techniques can also be used. One non-limiting aspect of techniques for transferring tool measurement data to the surface and receiving commands from the surface may include through-wall acoustic signaling, wherein the drillstring 8 may include one or more repeaters 30 to detect, amplify, and re-transmit signals both from the bottom of the wellbore to the surface, and from the surface to the bottom-hole assembly 24. At the surface, transducers 28 may convert signals between mechanical and electrical form, enabling a network interface module 36 to receive the uplink signal from the telemetry sub and (at least in some aspects) transmit a downlink signal to the telemetry sub.

A computer system 50 located at the surface receives a digital telemetry signal, demodulates the signal, and displays the tool data or well logs to a user. Although FIG. 1 depicts the computer system 50 as being hardwired to the telemetry system, it should be appreciated that the computer system 50 may be in wireless communication with the telemetry system. The computer system 50 may include a processor capable of executing instructions that may be stored in a non-transitory machine-readable medium 53 (e.g., ROM, EPROM, EEPROM, flash memory, RAM, a hard drive, a solid state disk, an optical disk, or a combination thereof). The processor of the computer system 50 may include one or more processors located at the surface or in the wellbore, such as integrated with the bottom-hole assembly 24. Software (represented in FIG. 1 as the non-transitory machine-readable medium 52) may govern the operation of the system 50. A user, for example a driller, may interact with the system 50 and the software 52 via one or more input devices 54 and 55 and one or more output devices 56. In some system aspects, the driller may employ the system 50 to make geosteering decisions (for example modifying the wellbore trajectory or steering the drill bit 14) and communicate appropriate commands to the bottom-hole assembly 24 to execute those decisions. On receipt of the geosteering instructions from the user, the bottom-hole assembly 24 may change its orientation or speed accordingly. The computer system 50 may be operable to perform calculations or operations to evaluate the formation, identify formation boundary positions, and/or steer the drill bit 14 as further described herein.

The drillstring shown in FIG. 1 illustrates a directional drilling operation, wherein drilling is performed along a path other than a straight vertical path downward. In at least some illustrative aspects, the change in direction may be achieved using a "bent sub," comprising a bent or curved tubular section along the drillstring near the drill bit. The bend or curve may be fixed or variable, with the direction of the drilling being determined either by the bend alone, or by a combination of the bend and the rotation of the drillstring. For example, if a downhole motor is used to drive the drill bit and a drillstring with a fixed bent sub is maintained at a fixed azimuthal orientation, the drillstring will gradually change direction towards the direction of the bend. If instead such a drillstring is rotated, drilling will progress along a line parallel to the drillstring section above the bend and about which the drill bit processes.

For drillstrings capable of varying the angle of the bent sub, the sub is set to a desired angle and direction while the drillstring is maintained at a desired fixed azimuthal orientation, with the drill bit being driven by the downhole motor. This is sometimes referred to as "slide drilling," as the drillstring slides through the wellbore without rotating. In other drillstring aspects, the drillstring continues to rotate and the angle of the bent sub is maintained by applying a force on the drillstring in a specific direction. This causes the sub to be pushed into the wellbore wall opposite the desired drilling direction to create an angle between the drillstring pipes and/or bottom-hole assembly units to either side of the sub. Such systems are sometimes referred to as rotary steerable systems.

Because of the angle change introduced by the above-described subs and systems used in directional drilling, and because of the bends produced in the drillstring by the resulting wellbore, logging tool subs located along the length of the drillstring may be oriented in different directions. This is particularly true for logging tools used in deep formation evaluation, for example tools in which a transmitter antenna is separated from a receive antenna by at least 20 feet (6.1 m). Thus, the transmitter and receiver antennas used in such tools may be housed in logging tool subs that are separated by larger distances (compared to other logging tools) in order to achieve the desired formation penetration of the transmitted signals. The greater the distance between the logging tool subs, the greater the inclination and strike angle differences may be between drillstring sections traversing a wellbore path that is curved or otherwise not a straight line. As used herein, the inclination angle of an LWD tool sub that houses an antenna may be defined as the angle between a true vertical z axis and the drillstring's z axis local to the antenna. The strike angle is defined as an angle between a reference vector normal to a vertical z axis and a projection onto a horizontal x-y plane of the drillstring's z axis local to the antenna (as illustrated in FIG. 2).

Figure 2:
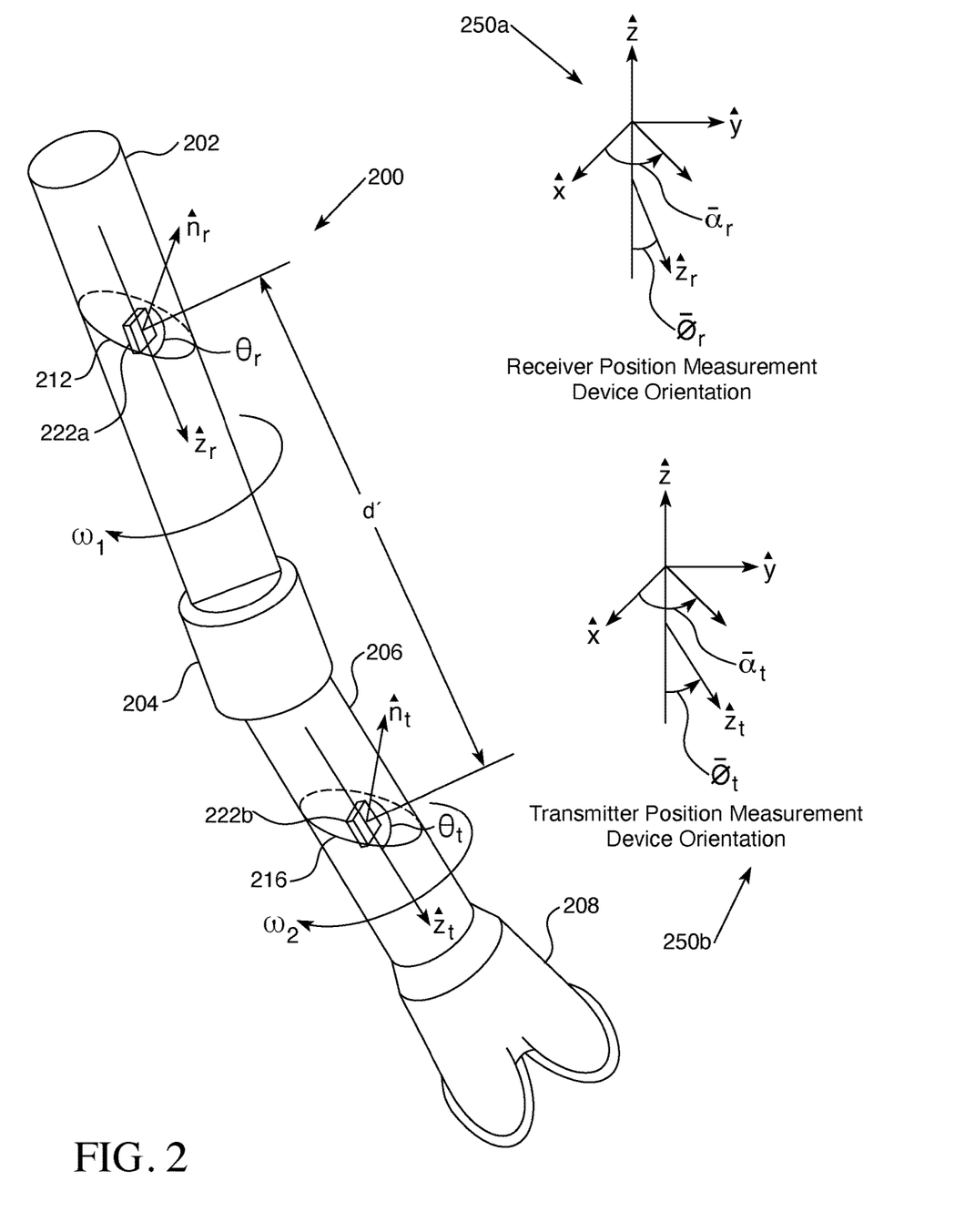
FIG. 2 depicts a schematic view of a resistivity logging tool, according to one or more aspects.

FIG. 2 shows a schematic view of a deep resistivity logging tool 200, in accordance with one or more aspects. The resistivity logging tool 200 may be included with the bottom-hole assembly 24 of FIG. 1 and may include, without limitation, two LWD tool subs 202 and 206 at different locations and orientations along a drillstring. A resistivity logging tool receiver antenna 212 and a corresponding receiver antenna position measurement device 222a may be housed within the LWD tool sub 202 (the "receiver sub"), while a resistivity logging tool transmitter antenna 216 and a corresponding transmitter antenna position measurement device 222b (components of an "at bit" instrument) are housed within the LWD tool sub 206 (the "transmit sub") and closer to the drill bit 208.

The position measurement devices 222a,b may locate the position of each corresponding antenna. For example, the positions of the transmitter and receiver antennae may be expressed, for example, in terms of each antenna's tilt angle, azimuth angle, inclination angle, and a distance between the two antennae. Thus, the receiver tilt angle $\theta_r$ and transmitter tilt angle $\theta_t$ may be measured relative to the receive sub longitudinal axis $z_r$ and transmit sub longitudinal axis $z_t$, respectively Thus, receiver tilt angle $\theta_r$ and transmitter tilt angel $\theta_t$ may be considered local angular measurements of the receiver and transmitter. Exemplary tilt angles $\theta_r$ and $\theta_t$ may range from 0 degrees (a coaxial antenna) to 180 degrees (co-planar antenna). Non-limiting examples of tilt angles may include about 0 degrees, about 45 degrees, about 90 degrees, about 135 degrees, about 180 degrees, or any value of range of values therebetween including end points. In one aspect, the receiver tilt angle $\theta_r$ may be about 0 degrees (coaxial) and the transmitter tilt angle $\theta_t$ may be about 45 degrees. In another aspect, the receiver tilt angle $\theta_r$ may be about 45 degrees and the transmitter tilt angle $\theta_t$ may be about 0 degrees (coaxial).

Each antenna's azimuthal angle $\alpha_r$ and $\alpha_t$ may be measured relative to a reference coordinate system x axis. Each LWD tool sub's inclination angle $\phi_r$ and $\phi_t$ may be measured relative to the reference coordinate system z axis. The reference coordinate system may be defined above ground at the well site. The reference z axis may point to gravitational vertical, and the reference x and y axes may be defined with reference to true north or magnetic north. Thus, azimuthal angles $\alpha_r$ and $\alpha_t$ and inclination angles $\phi_r$ and $\phi_t$ may therefore be dependent on the position and orientation of the receiver and transmitter antennae within the borehole. As disclosed above, the receiver azimuthal angle $\alpha_r$ and inclination angles $\phi_r$ are measured with respect to the reference axes 250a. As disclosed above, the transmitter azimuthal angle $\alpha_t$ and inclination angles $\phi_t$ are measured with respect to the reference axes 250b. The distance d' may be measured between the transmitter antenna and the receiver antenna. The distance d' may be in a range of about 10 ft. (about 3 m) to about 200 ft. (about 61 m). Non-limiting examples of the distance between the transmitter antenna and the receiver antenna may be about 10 ft. (about 3 m), about 40 ft. (about 12 m), about 80 ft. (about 24 m), about 100 ft. (about 30 m), about 140 ft. (about 43 m), about 180 ft. (about 55 m), about 200 ft. (about 61 m), or any value or range of values therebetween including endpoints. Further, each of the receiver antenna and the transmitter antenna may be defined by a plane having a normal vector $n_f$ and $n_r$, respectively. All of these values may be known initially or readily calculated during drilling.

In FIG. 2, it should be noted that although the bent sub angles may be typically less than five degrees, the illustration depicts a more pronounced angle merely to better illustrate the effect of the angles on the relative spatial locations of the antennae, described in more detail below.

During drilling operation, both the receive sub and the transmit sub may rotate about their respective longitudinal axes, $z_r$ and $z_t$ at rotational rates $\omega_1$ and $\omega_2$, respectively. Exemplary rotational rates $\omega_1$ and $\omega_2$ may have a range of values between about 10 rpm and about 300 rpm. Non-limiting examples of a rotation rate may include about 10 rpm, about 20 rpm, about 30 rpm, about 50 rpm, about 100 rpm, about 200 rpm, about 300 rpm, or any value or range of values therebetween including end points. Typically, both the receiver sub and the transmitter sub rotate in synchrony.

The resistivity logging tool 200 in communication with the computer system 50 of FIG. 1 is used to determine formation resistivity, which is used to evaluate the formation and/or determine a wellbore trajectory to produce formation fluids, such as hydrocarbon fluids. It should be appreciated that the resistivity logging tool 200 is an exemplary tool for measuring formation data and other suitable logging tools may be used. Also, other resistivity logging tools may employ different antenna configurations to evaluate the formation resistivity.

The formation resistivity may be used to generate a resistivity model of the formation and determine the uncertainty of a parameter included in or determined from the formation data. A resistivity model may be used to identify boundary positions between formation strata and determine the wellbore trajectory to produce formation fluids. The uncertainty of a parameter indicates a range of suitable values for a particular parameter such as the uncertainty of resistivity values or boundary positions of formation layers. For instance, the uncertainty of a boundary position may not provide an accurate estimate of where a formation boundary may be located, but merely indicate a possible range of values for the boundary position. As used herein, the uncertainty of a parameter refers to a range of suitable values for the parameter or a measure that is used to quantify a variation in the parameter (e.g., standard deviation). The parameter may include any one or any combination of a horizontal resistivity, vertical resistivity, conductivity, an anisotropy ratio, a boundary position of formation layers, and a formation dip.

When determining formation resistivity, the transmitter antenna 216 may transmit an AC signal at a known phase, amplitude, and frequency through the formation. The phase, amplitude, and frequency of the signal may be predetermined, or may be determined as the signal is transmitted based on the current and/or voltage used by the transmitter antenna 216 to transmit the signal. Further, such determinations of phase, amplitude, and/or frequency may be made by a computer system within the logging tool 200 and/or by the computer system 50 of FIG. 1. In some aspects, the transmission frequency of the transmit antenna 216 may be in a range of about 1 KHz to about 100 KHz. Non-limiting examples of the transmission frequency may include about 1 KHz, about 3 KHz, about 5 KHz, about 10 KHz, about 30 KHz, about 50 KHz, about 100 KHz, or any value of range of values therebetween including end points.

The signal transmitted by the transmitter antenna 216 may be attenuated and/or undergo a change in phase as it passes through the formation and is emitted by it. The signal emitted by the formation may then be received by the receiver antenna 212. In some aspects, the voltage of the signal received by the receiver antenna may be normalized according to a current flowing through the transmitter antenna, or a power of the signal transmitted by the transmitter antenna. Additionally, the voltage of the signal received by the receiver antenna may be compensated for thermal drift errors in the receiver antenna and/or its electronics. A phase and an amplitude for the received signal may then be determined by a computer system within the logging tool 200 and/or by the computer system 50 of FIG. 1. Additionally, the computer system within the logging tool 200 and/or by the computer system 50 of FIG. 1 may also calibrate the receiver based on the temperature and/or pressure at the location of the receiver within the wellbore.

The signal received by the receiver (that is, the signal emitted by the formation upon receiving the signal transmitted by the transmitter antenna) may be digitized. The digitized received signal may be analyzed according to a Fourier Transform algorithm to produce a receiver signal amplitude (real part) at the transmission frequency and a receiver signal phase (imaginary part) at the transmission frequency.

Figure 3:
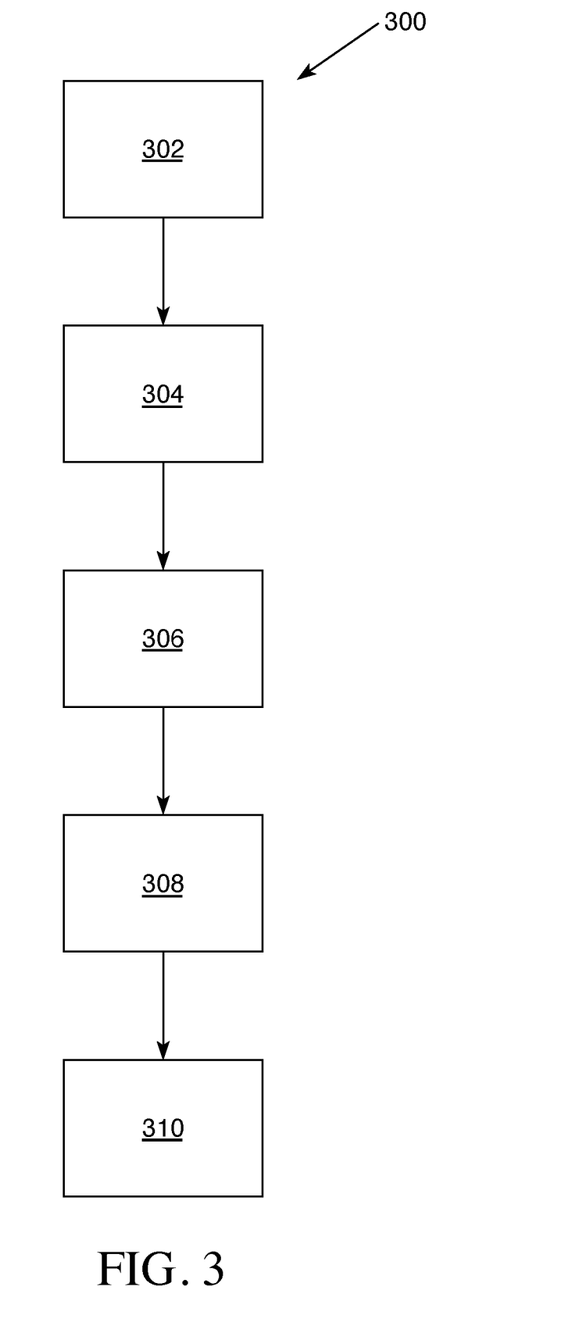
FIG. 3 depicts a flow chart of a method to model subterranean formations, according to one or more aspects.

FIG. 3 shows a flow chart of a method 300 to generate a formation model using formation data measured from the resistivity logging tool 200 of FIG. 2, in accordance with one or more aspects. At block 302, the inversion algorithm may generate solutions based on the set of initial conditions provided to the algorithm. At block 304, the set of inversion algorithm solutions may be filtered to yield the solutions that meet the convergence criteria (convergent solutions), as disclosed above with respect to the inversion algorithm. At block 306, the filtered solutions are converted into pixelated convergent solutions as further described herein. The pixelated convergent solutions may provide an efficient way to analyze the inversion algorithm solutions representing varying numbers of formation layers. At block 308, the pixelated convergent solutions may be used to generate a formation model while providing the highest contrast between layers. At block 310, the formation model may be used to evaluate the formation, develop a wellbore trajectory, or steer a drill bit to produce formation fluids. Alternatively, a driller may use the formation model to determine a direction and/or orientation of the drill to proceed. In this manner, the driller or model user may use the model to direct the drill into a portion of the formation most likely to produce extractable fluids. The steps in this flowchart are further described below.

At block 302, multiple initial conditions are applied to an inversion algorithm, resulting in multiple inversion algorithm solutions (hereafter, solutions). The inversion algorithm may be run with a plurality of random initial conditions with one or more formation layers, as disclosed above, and randomly generated resistivity values for each layer. In some aspect, several hundred model solutions may be obtained.

At block 304, the plurality of solutions are filtered so that only convergent solutions are retained. In some aspects, divergent solutions may be discarded immediately after being generated, in which case the steps of blocks 302 and 304 may be combined. It may be recognized that the inversion algorithm and solution filtering may occur at each measurement depth for which measured resistivity data have been acquired.

At block 306, once the convergent solutions are identified, the convergent solutions are converted into pixelated convergent solutions. The convergent solutions are continuously valued functions. In some aspects, the convergent solutions may be defined by modeled resistivity values at a measurement distance as a function of true vertical depth. In some alternative aspects, the convergent solutions may be defined by one or more of a horizontal resistivity, a vertical resistivity, a conductivity, an anisotropy ratio, and a formation dip. Due to the number of points generated for each convergent solution, it may be less calculation intensive to associate the values for the convergent solutions with a smaller number of blocks or pixels, thereby forming pixilated convergent solutions. In some aspects, the number of pixels for each pixilated convergent solution may comprise about 50 to 500 pixels. In some non-limiting examples, the number of pixels into which each convergent solution may be pixilated may be about 50 pixels, about 100 pixels, about 150 pixels, about 200 pixels, about 250 pixels, about 300 pixels, about 400 pixels, about 500 pixels, or any value or values therebetween including endpoints. Each pixel may be assigned a measurement distance, and the set of assigned measurement distances may be the same for each of the pixilated convergent solutions. The resistivity value for each of the pixels may be calculated, for each convergent solution, by interpolating the resistivity value for each convergent solution above and below the measurement distance assigned to each pixel. In some alternative aspects, the pixels may be further normalized to adjust the values of certain pixels and compensate for any uncertainties in the pixilated convergent solution. For example, the pixels far away from the tool position, which are less sensitive to resistivity boundaries, may be adjusted to account for presumed measurement inaccuracies At block 308, an initial set of ensemble statistics are derived for the plurality of pixilated convergent solutions along the measurement depth. In one aspect, at each depth value, a statistic may be calculated to represent the average resistivity at that depth. In another aspect, at each depth value, a statistic may be calculated to represent the lower $5^{th}$ percentile of the resistivity values at that depth. In another aspect, at each depth value, a statistic may be calculated to represent the lower $50^{th}$ percentile or median value of the resistivity values at that depth. In yet another aspect, at each depth value, a statistic may be calculated to represent the lower $95^{th}$ percentile of the resistivity values at that depth. Graphs may be generated for each statistic along the total measurement depth. As disclosed above, such summary statistics may not individually be able to provide accurate indications of the boundary separations. Thus, additional processing may be required.

As discussed above, each of the convergent solutions along the measurement depth may be pixelated or binned, resulting in a finite number of sequential pixels along the measurement depth for each pixilated convergent solution. Each pixel is defined by a depth and a resistivity value, as disclosed above. A derivative or difference in resistivity values between successive pixels along a single pixilated convergent solution may be calculated along the measurement depth. It may be understood that sequential pixels close to or at a layer boundary may show larger difference values than sequential pixels located within a particular layer. Sequential pixels within a stratum may have nearly identical resistivity values (apart from noise) while pixels located at or near a boundary may possess resistivity values depending on which side of a boundary they are found.

Each set of difference values between pixels that have a large magnitude difference may represent a presumptive boundary location. In some non-limiting examples, the magnitude of sequential pixel resistivity differences greater than or equal to about 2% may be used to identify those pixels at or near strata boundaries (presumptive layer boundaries). It may be understood that some pixilated convergent solutions may not include sequential resistivity difference values meeting the criterion to be considered an indicator of a layer boundary. Based on this derivative method, sequential pixels in each pixilated convergent solution may be analyzed, and those that provide boundary locations may be identified. The pixels so identified may then be analyzed according to a cluster analysis, wherein groups of such boundary-defining pixels may be considered as a single cluster. Each of the boundary clusters may then be further analyzed to provide a mean or median value for the measurement depth of the cluster. The mean or median value of the resistivity at that boundary may also be determined.

The mean or median measurement depth of the clusters may be used to determine the presumptive boundaries between sequential strata. In some aspects, the measurement of these presumptive boundaries may be chosen by an algorithm to improve the contrast of a model of the formation strata. Alternatively, the presumptive boundaries may be chosen by a user of the model calculations by hand.

Once the presumptive layer boundaries have been identified, a composite resistivity statistic may be generated by stitching together one or more of the mean, D05, D50, and D95 ensemble statistics. For example, for a layer having solutions indicative of a high resistivity value, the D95 statistic may be used to characterize that layer throughout its measurement depth. For a layer having solutions indicative of a low resistivity value, the D05 statistic may be used to characterize that layer throughout its measurement depth. The graphs of the individual ensemble statistics may be truncated at measurement depths indicated by the cluster analysis as locations of the presumptive layer boundaries.

The resistivity values may be determined from the top formation stratum to the bottom formation stratum to form the best contrast model. For example, the very top formation layer can be picked as prior information, average resistivity, or median resistivity, or other accurate measurement. The layers may be considered consecutively. Thus, if the layer below the currently analyzed layer has lower resistivity value compared to the currently analyzed layer, then the lower layer may be assigned resistivity value from D05. However, if the layer below the currently analyzed layer has higher resistivity value than the currently analyzed layer, then the resistivity value may be assigned as D95. With such arrangement, the average/D05/D50/D95 statistics may all be combined into one statistic to form a composite resistivity statistic that has the best formation contrast.

At block 310, a wellbore trajectory 502 may be developed to penetrate one or more formation layers suitable for producing formation fluids, such as hydrocarbons based on the composite resistivity statistic.

Figure 4A:
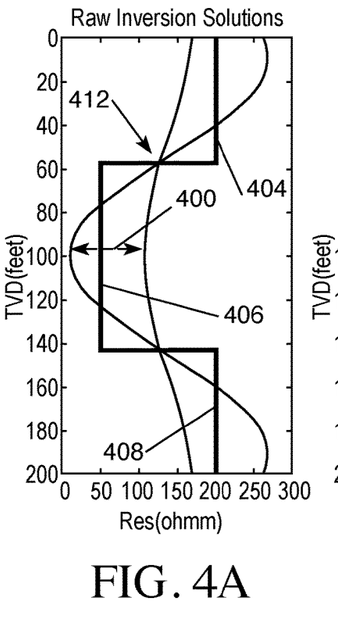
FIG. 4A depicts a graphical view of a plurality of convergent inversion algorithm solutions, according to one or more aspects.
Figures 4B, 4C:
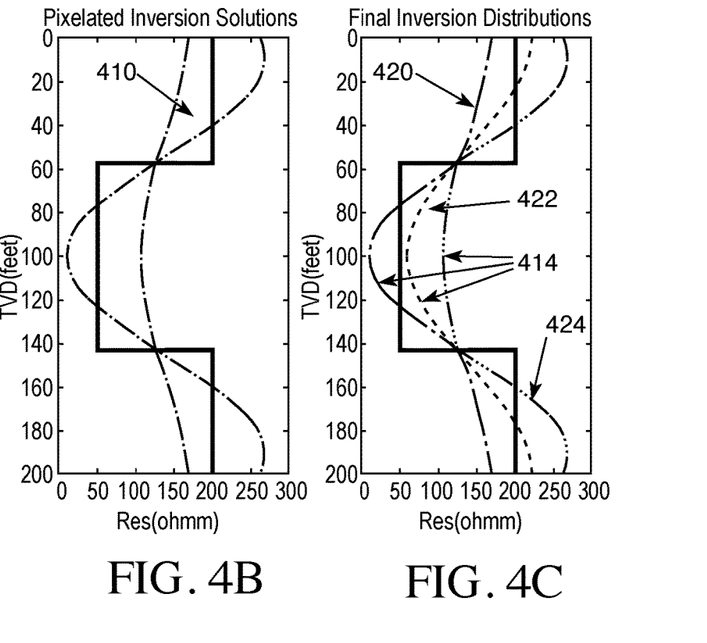
FIG. 4B depicts a graphical view of the plurality of convergent solutions of FIG. 4A after a pixilation step, according to one or more aspects.
FIG. 4C depicts a graphical view of a plurality of ensemble statistics derived from the pixelated convergent solutions of FIG. 4B, according to one or more aspects.

FIGS. 4A, 4B, 4C, 4D, and 4E depict, schematically, the method described by blocks 302, 304, 306, and 308 in FIG. 3 using a set of simulated measured resistivity data obtain from a three-layer formation model. A simulation is run of a formation comprising three layers, 404, 406, and 408, each characterized by a resistivity value. As depicted in FIG. 4A, simulated measured resistivity data are generated for the simulated formation. The plurality of convergent inversion algorithm solutions 400 are calculated using the inversion algorithm, disclosed above. Each convergent solution is pixilated along the length of the measurement distance, resulting in a plurality of pixilated convergent solutions 410, as illustrated in FIG. 4B. FIG. 4C depicts the ensemble statistics 414 calculated for the plurality of pixilated convergent solutions 410 at each measurement depth. Exemplary aspects of ensemble statistics may include a graph of the lower 5th percentile solution 420, the lower 50th percentile (median) solution 422, and the lower 95th percentile solution 424.

As disclosed above, any one of these ensemble statistics may not individually provide sufficient contrast between the successive layers 404, 406, and 408 due to resistivity bias in the calculation of the ensemble statistics.

Figure 4D:
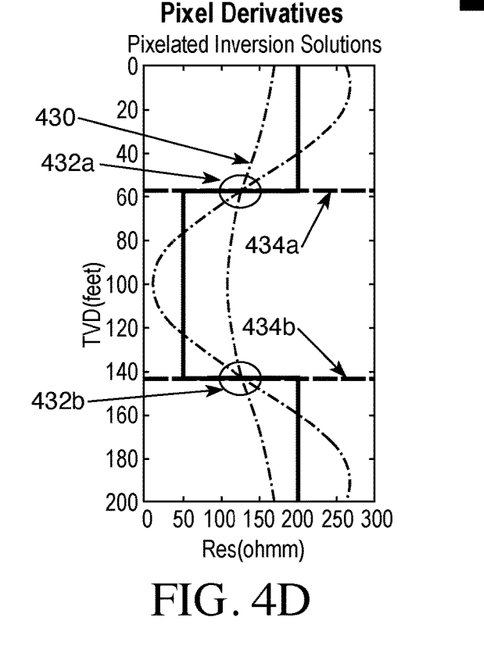
FIG. 4D depicts a graphical view of a clustering analysis of the convergent pixelated solutions of FIG. 4B.

FIG. 4D illustrates the calculation of the derivative of difference values taken between pixels 430. As disclosed above, pixels may be identified that have a difference magnitude greater than a threshold, such as 2%. Those pixels identified as having differences greater than a threshold may form clusters 432a,b. The clusters 432a,b may be characterized as having a mean or median measurement depth value. The mean or median cluster depth values may betaken as the depth values of the presumptive layer boundaries 434a,b, between the three layers 404, 406, and 408. It may be understood that presumptive layer boundaries 434a,b may be derived from the cluster analysis, or entered by hand by a user of the inversion algorithm software.

Figure 4E:
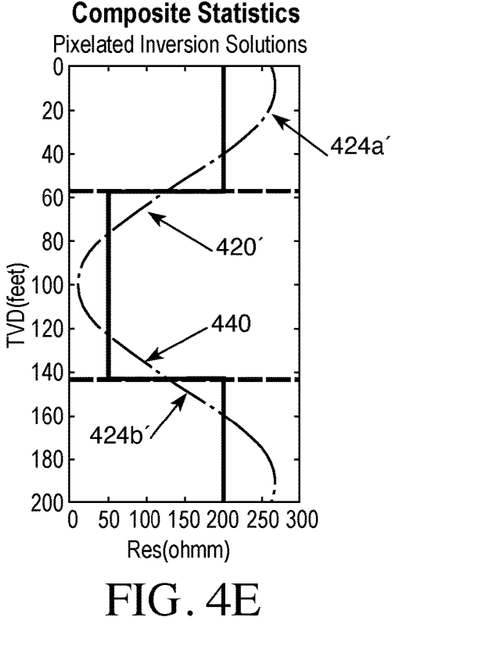
FIG. 4E depicts a graphical view of a composite resistivity statistic generated from the clustering analysis of FIG. 4D and the ensemble statistics of FIG. 4C.

FIG. 4E illustrates the composite resistivity statistic 440. The composite resistivity statistic 440 may be composed of a first D95 statistic 424a' through layer 404, a D05 statistic 420' through layer 406, and a second D95 statistic 424b' through layer 408. The first D95 statistic 424a' may be truncated at a first presumptive boundary 434a between layers 404 and 406. The D05 statistic 420' may be truncated at the first presumptive boundary 434a between layers 404 and 406, and at the second presumptive boundary 434b between layers 406 and 408. The second D95 statistic 424b' may be truncated at the second presumptive boundary 434b between layers 406 and 408.

Figure 5:
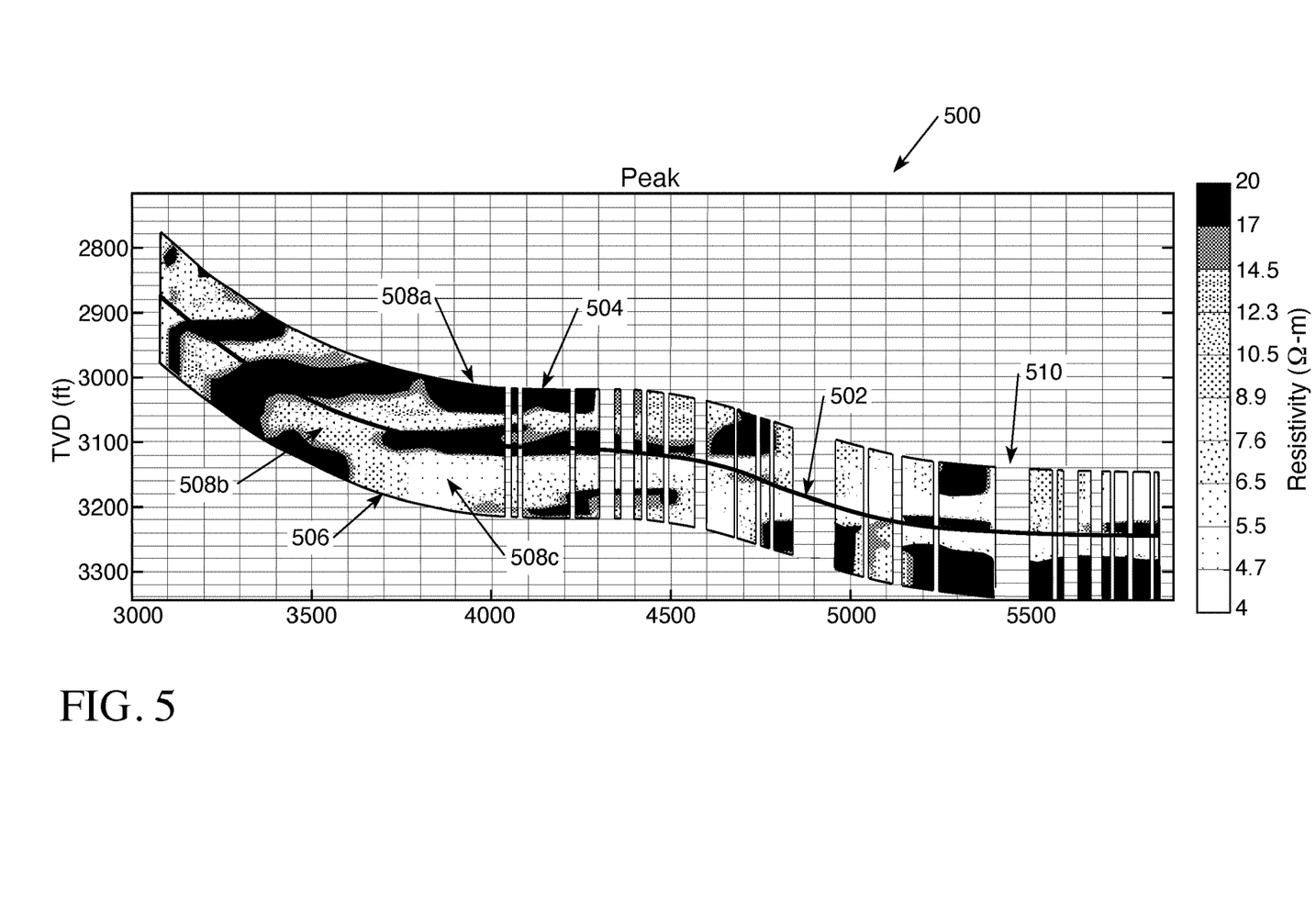
FIG. 5 depicts a graph view of a resistivity profile, according to one or more aspects.

FIG. 5 depicts a graph 500 of a model of a formation surrounding a wellbore 502 developed from the inversion algorithm disclosed above. The model formation was obtained using measured resistivity data obtained from an actual drilling site. The ordinate is the true vertical depth through the formation and the abscissa is the horizontal extent of the wellbore as it traverses through the formation. The model of the formation extends above the wellbore 502 at a top measurement depth 504 to below the wellbore 502 at a bottom measurement depth 506. The shading indicates the resistivity of the layers according to the bar to the right of the graph 500. It can be observed that the individual layers are well defined according to their respective resistivities. Thus, a first layer 508a has a high resistivity of around 20 Ω-m, a second layer 508b has a medium resistivity of around 7.6 Ω-m, and a third layer 508c has a low resistivity of around 4.7 Ω-m. All of these layers 508a-c have well defined boundaries. Gaps 510 in the graph 500 may indicate areas of the formation in which the measured resistivity data had not been obtained, or the measured resistivity data were too noisy to analyze.

This discussion is directed to various aspects of the present disclosure. The drawing figures are not necessarily to scale. Certain features of the aspects may be shown exaggerated in scale or in somewhat schematic form and some details of conventional elements may not be shown in the interest of clarity and conciseness. Although one or more of these aspects may be preferred, the aspects disclosed should not be interpreted, or otherwise used, as limiting the scope of the disclosure, including the claims. It is to be fully recognized that the different teachings of the aspects discussed may be employed separately or in any suitable combination to produce desired results. In addition, one skilled in the art will understand that the description has broad application, and the discussion of any aspect is meant only to be exemplary of that aspect, and not intended to suggest that the scope of the disclosure, including the claims, is limited to that aspect.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis.

The use of "top," "bottom," "above," "below," and variations of these terms is made for convenience, but does not require any particular orientation of the components.

Reference throughout this specification to "one aspect," "an aspect," or similar language means that a particular feature, structure, or characteristic described in connection with the aspect may be included in at least one aspect of the present disclosure. Thus, appearances of the phrases "in one aspect," "in an aspect," and similar language throughout this specification may, but do not necessarily, all refer to the same aspect.

Although the present invention has been described with respect to specific details, it is not intended that such details should be regarded as limitations on the scope of the invention, except to the extent that they are included in the accompanying claims.

What is claimed is:

1. A system for evaluating a subterranean earth formation having a wellbore intersecting the subterranean earth formation, comprising:
    a logging tool operable to measure formation data and locatable in the wellbore, wherein the logging tool comprises:
        a transmitter antenna; and
        a receiver antenna; and
    a processor and a non-transitory memory device in data communication with the logging tool, wherein the non-transitory memory device comprises instructions that, when executed by the processor, cause the processor to:
        control a current and a voltage sourced to the transmitter antenna, causing the transmitter antenna to transmit a first electromagnetic signal into the subterranean earth formation at a plurality of depths along the wellbore;
        receive, via the receiver antenna, a plurality of second electromagnetic signals at the plurality of depths along the wellbore, wherein each of the plurality of second electromagnetic signals is emitted by the subterranean earth formation in response to the first electromagnetic signal as the logging tool traverses the plurality of depths along the wellbore;
        calculate a plurality of resistivity values for the plurality of second electromagnetic signals;
        calculate a plurality of solutions to an inversion algorithm of the subterranean earth formation, wherein each of the plurality of solutions comprises a solution resistivity measurement as a function of the plurality of depths along the wellbore;
        filter the plurality of solutions according to a filter threshold value into a plurality of convergent solutions;
        pixilate each of the convergent solutions of the plurality of convergent solutions into a pixilated convergent solution of a plurality of pixilated convergent solutions;
        calculate one or more ensemble statistics for the plurality of pixilated convergent solutions;
        calculate a difference in resistivity value between successive pixels in each of the pixilated convergent solutions of the plurality of pixilated convergent solutions along the plurality of depths along the wellbore;
        identify one or more presumptive layer boundaries based on the differences in resistivity values between the successive pixels;
        calculate one or more composite resistivity statistics of the plurality of pixilated convergent solutions based at least in part on the one or more presumptive layer boundaries and the one or more ensemble statistics; and
        generate a formation model based on the one or more composite resistivity statistics.

2. The system for evaluating a subterranean earth formation of claim 1, wherein the plurality of solutions are filtered based on the calculated plurality of resistivity values of the plurality of second electromagnetic signals.

3. The system for evaluating a subterranean earth formation of claim 1, wherein the one or more ensemble statics comprise one or more of a lower 5th percentile of resistivities, a median resistivity, an average resistivity, or a lower $95^{th}$ percentile of resistivities.

4. The system for evaluating a subterranean earth formation of claim 1, wherein each of the pixilated convergent solutions comprises 50 to 500 pixels.

5. The system for evaluating a subterranean earth formation of claim 1, wherein each of the pixilated convergent solutions comprises 200 pixels.

6. The system for evaluating a subterranean earth formation of claim 1, wherein the non-transitory memory device comprises instructions that, when executed by the processor, further cause the processor to identify one or more of the pixels of the plurality of pixilated convergent solutions according to a difference in resistivity value between successive pixels that is greater than a difference threshold.

7. The system for evaluating a subterranean earth formation of claim 6, wherein the difference threshold comprises a difference of greater than or equal to 2%.

8. The system for evaluating a subterranean earth formation of claim 6, wherein the non-transitory memory device comprises instructions that, when executed by the processor, further cause the processor to cluster the one or more identified pixels into clusters.

9. The system for evaluating a subterranean earth formation of claim 8, wherein the non-transitory memory device comprises instructions that, when executed by the processor, further cause the processor to identify the one or more presumptive layer boundaries based at least in part on the clusters of the one or more identified pixels.

10. The system for evaluating a subterranean earth formation of claim 8, wherein the non-transitory memory device comprises instructions that, when executed by the processor, further cause the processor to calculate the one or more composite resistivity statistics based at least in part on the one or more presumptive layer boundaries and a set of ensemble statistics.

11. A method of evaluating a subterranean earth formation, comprising:
    inserting a logging tool comprising a transmitter antenna and a receiver antenna within a wellbore intersecting the subterranean earth formation;
    controlling a current and a voltage sourced to a transmitter antenna, causing the transmitter antenna to transmit a first electromagnetic signal into the subterranean earth formation at a plurality of depths along the wellbore;
    receiving, via the receiver antenna, a plurality of second electromagnetic signals at the plurality of depths along the wellbore intersecting the subterranean earth formation, wherein each of the plurality of second electromagnetic signals is emitted by the subterranean earth formation in response to the first electromagnetic signal as the receiver antenna traverses the plurality of depths along the wellbore intersecting in the subterranean earth formation;

calculating a plurality of resistivity values for the plurality of second electromagnetic signals;

calculating a plurality of solutions to an inversion algorithm, wherein each of the plurality of solutions comprises a solution resistivity measurement as a function of the plurality of depths along the wellbore;

filtering the plurality of solutions according to a filter threshold value into a plurality of convergent solutions;

pixilating each of the convergent solutions of the plurality of convergent solutions into a pixelated convergent solution, thereby forming a plurality of pixilated convergent solutions;

calculating one or more ensemble statistics of the plurality of pixilated convergent solutions;

calculating a difference in resistivity value between successive pixels in each of the pixelated convergent solutions of the plurality of pixilated convergent solutions along the plurality of depths along the wellbore;

identifying one or more presumptive layer boundaries based on the differences in resistivity values between the successive pixels;

calculating one or more composite resistivity statistics of the plurality of pixilated convergent solutions based at least in part on the one or more presumptive layer boundaries and the one or more ensemble statistics;

generating a formation model based on the one or more composite resistivity statistics; and directing, by a user, a drill bit position and orientation within the subterranean earth formation based on the formation model.

12. The method of evaluating the subterranean earth formation of claim 11, further comprising filtering the plurality of solutions based on the calculated plurality of resistivity values of the plurality of second electromagnetic signals.

13. The method of evaluating the subterranean earth formation of claim 11, further comprising pixilating each of the convergent solutions of the plurality of convergent solutions into a pixelated convergent solution comprising 50 to 500 pixels.

14. The method of evaluating the subterranean earth formation of claim 11, further comprising pixilating each of the convergent solutions of the plurality of convergent solutions into a pixelated convergent solution comprising 200 pixels.

15. The method of evaluating the subterranean earth formation of claim 11, further comprising calculating one or more ensemble statics of the plurality of pixilated convergent solutions comprising one or more of a lower $5^{th}$ percentile of resistivities, a median resistivity, an average resistivity, or a lower $95^{th}$ percentile of resistivities.

16. The method of evaluating the subterranean earth formation of claim 11, further comprising identifying one or more of the pixels of the plurality of pixilated convergent solutions according to a difference in resistivity value between successive pixels that is greater than a difference threshold.

17. The method of evaluating the subterranean earth formation of claim 16, wherein identifying one or more of the pixels of the plurality of pixilated convergent solutions according to a difference in resistivity value between successive pixels that is greater than or equal to 2%.

18. The method of evaluating the subterranean earth formation of claim 16, further comprising, clustering the one or more identified pixels into clusters.

19. The method of evaluating the subterranean earth formation of claim 18, further comprising, identifying the one or more presumptive layer boundaries based at least in part on the clusters of the one or more identified pixels.

20. The method of evaluating the subterranean earth formation of claim 11, further comprising calculating the one or more composite resistivity statistics based at least in part on the one or more presumptive layer boundaries and a set of ensemble statistics.

\* \* \* \* \*